(12) United States Patent
Clonts et al.

(10) Patent No.: US 8,664,608 B2
(45) Date of Patent: Mar. 4, 2014

(54) SHIFTING SCINTILLATOR NEUTRON DETECTOR

(75) Inventors: Lloyd G. Clonts, Knoxville, TN (US); Ronald G. Cooper, Oak Ridge, TN (US); Morris Lowell Crow, Jr., Oak Ridge, TN (US); Bruce W. Hannan, Maryville, TN (US); Jason P. Hodges, Knoxville, TN (US); John D. Richards, Knoxville, TN (US); Richard A. Riedel, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/510,362

(22) PCT Filed: Nov. 23, 2010

(86) PCT No.: PCT/US2010/057798
§ 371 (c)(1),
(2), (4) Date: May 17, 2012

(87) PCT Pub. No.: WO2011/066277
PCT Pub. Date: Jun. 3, 2011

(65) Prior Publication Data
US 2012/0228510 A1  Sep. 13, 2012

Related U.S. Application Data

(60) Provisional application No. 61/264,307, filed on Nov. 25, 2009.

(51) Int. Cl.
*G01T 1/20*  (2006.01)

(52) U.S. Cl.
USPC ............................ 250/362; 250/366; 250/368

(58) Field of Classification Search
USPC .......................................... 250/362, 366, 368
See application file for complete search history.

(56) References Cited

U.S. PATENT DOCUMENTS

| | | | |
|---|---|---|---|
| 4,942,302 A | | 7/1990 | Koechner |
| 5,231,290 A | * | 7/1993 | Czirr et al. ............... 250/390.11 |
| 5,298,756 A | | 3/1994 | McCollum et al. |
| 5,880,469 A | * | 3/1999 | Miller ........................... 250/367 |

(Continued)

FOREIGN PATENT DOCUMENTS

| EP | 0 899 588 A2 | 3/1999 |
|---|---|---|
| EP | 1113291 A1 | 7/2001 |

OTHER PUBLICATIONS

"Shifting scintillator prototype large pixel wavelength-shifting fiber detector for the POWGEN3 powder diffractometer," Nuclear Instruments and Methods in Physics Research A 529 (2004), p. 287-292 to Crow et al.*

(Continued)

*Primary Examiner* — David Porta
*Assistant Examiner* — Kenneth J Malkowski
(74) *Attorney, Agent, or Firm* — Scully, Scott, Murphy & Presser, P.C.

(57) ABSTRACT

Provided are sensors and methods for detecting thermal neutrons. Provided is an apparatus having a scintillator for absorbing a neutron, the scintillator having a back side for discharging a scintillation light of a first wavelength in response to the absorbed neutron, an array of wavelength-shifting fibers proximate to the back side of the scintillator for shifting the scintillation light of the first wavelength to light of a second wavelength, the wavelength-shifting fibers being disposed in a two-dimensional pattern and defining a plurality of scattering plane pixels where the wavelength-shifting fibers overlap, a plurality of photomultiplier tubes, in coded optical communication with the wavelength-shifting fibers, for converting the light of the second wavelength to an electronic signal, and a processor for processing the electronic signal to identify one of the plurality of scattering plane pixels as indicative of a position within the scintillator where the neutron was absorbed.

20 Claims, 4 Drawing Sheets

(56) References Cited

U.S. PATENT DOCUMENTS

| | | |
|---|---|---|
| 6,989,541 B2 | 1/2006 | Penn |
| 7,126,148 B2 | 10/2006 | Murray et al. |
| 7,214,943 B2 | 5/2007 | Katagiri et al. |
| 7,372,041 B1 | 5/2008 | Nagarkar et al. |

OTHER PUBLICATIONS

"Dead-time optimized time-correlated photon counting instrument with synchronized, independent timing channels" to Wahl et al., published by Rev. Sci. Instruments (2007), p. 1-6.*

"Generation of Fiber-Coupled, Nondegenerate, Polarization-Entangled Photons for Quantum Communication" published by the Massachusetts Institute of Technology, Jun. 2009, p. 1-41 to Bhaskar Mookerji, available online at: http://dspace.mit.edu/bitstream/handle/1721.1/51594/495362264.pdf?sequence=1.*

International Search Report dated Jan. 27, 2011 issued in PCT/US2010/057798.

* cited by examiner

SHIFTING SCINTILLATOR NEUTRON DETECTOR

CROSS-REFERENCE TO RELATED APPLICATIONS

This application claims priority from U.S. Provisional Patent Application Ser. No. 61/264,307, SHIFTING SCINTILLATOR NEUTRON DETECTOR, filed Nov. 25, 2009, the contents of which are incorporated herein by reference.

STATEMENT REGARDING FEDERALLY SPONSORED RESEARCH AND DEVELOPMENT

This invention was made with government support under Contract No. DE-ACO5-00OR22725 awarded by the U.S. Department of Energy. The government has certain rights in the invention.

BACKGROUND

1. Field

The present disclosure relates to sensors and methods for detecting neutrons for research, medical, security and other applications.

2. Description of the Related Art

Neutrons are uncharged particles that can travel through matter without ionizing the matter. Because neutrons travel through matter in such a manner, neutrons are difficult to detect directly. Some other evidence of a neutron event must be detected in order to determine its existence. An indirect method detects the results of a neutron interaction event and not the neutron itself. For example, alpha and triton particles are emitted when $^6Li$ captures a neutron, and give off energy that can be measured.

A scintillator is material that emits light upon absorbing ionizing radiation or energy from ionizing radiation. A scintillation counter measures this ionizing radiation. Generally, the counter includes a sensitive photomultiplier tube that measures the light from the fluorescent material. The photomultiplier tube is attached to an electronic amplifier and other electronic equipment to count and possibly quantify the amplitude of the signals produced by the photomultiplier. The subsequent multiplication of those electrons (alternatively referred to as photoelectrons) results in an electrical pulse that can then be analyzed and yield meaningful information about the particle that originally struck the scintillator.

Coded scintillation detectors are presently used in some neutron diffraction instruments. A powder diffractometer use end-on optical fibers to collect light and transport to photomultiplier tubes for coincidence coding. The small area and narrow angular acceptance of the fiber ends limit the light collection efficiency. The prospect of better light collection efficiency has driven several recent efforts in detector design for thermal neutron detection using wavelength-shifting fibers.

SUMMARY

Provided are apparatuses for detecting neutrons. In one example, an apparatus includes a scintillator for absorbing neutrons. The scintillator is provided with a back side for discharging a blue scintillation light in response to an absorbed neutron. An array of wavelength-shifting fibers can be disposed proximate the back side for shifting the blue scintillation light to green light. The fibers can be disposed in a two-dimensional pattern, which defines a plurality of scattering plane pixels where the fibers overlap in the array. A photomultiplier tube can be in coded optical communication with the fibers for converting the green light to electronic signals. A processor can analyze the time structure of the electronic signals to determine whether the event is a neutron, and the coding pattern to determine where within the scintillator the neutron was absorbed.

Also provided are methods of locating a neutron event with a detector. In one example, a neutron can be absorbed within a scintillator. A blue scintillation light can be discharged from a back side of the scintillator to an array of green wavelength shifting fibers. The blue scintillation light can be absorbed with an array of green wavelength shifting fibers. The green wavelength shifting fibers can provide green wavelength light to photomultiplier tubes. The photomultiplier tubes can then be used to generate current pulses from the green wavelength light. A series of fast comparators can next be triggered with the current pulses from the photomultiplier tubes. The electrical pulses can then be digitized into a bit stream by the fast comparators. With a high speed field programmable gate array, the bit stream can be analyzed to identify which photomultiplier tubes generated the current pulses. The time structure of the pulses may be used to identify the event as a neutron capture. Based on the coincidence between the identified photomultiplier tubes, a specific pixel location within the scintillator can be determined.

BRIEF DESCRIPTION OF THE SEVERAL VIEWS OF THE DRAWINGS

These and other features, aspects, and advantages of the methods apparatus of the present invention will become better understood with regard to the following description, appended claims, and accompanying drawings where:

DETAILED DESCRIPTION

Embodiments will hereinafter be described with reference to the drawings.

Figure 1:
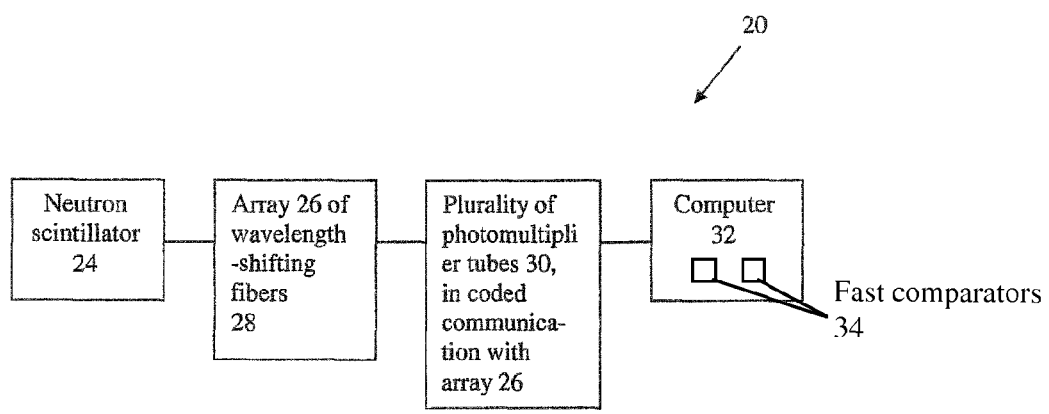
FIG. 1 is a schematic view of an example shifting scintillator neutron detector.

A shifting scintillator neutron detector (SSND) 20 for use in detecting thermal neutrons while rejecting gamma radiation events through pulse shape discrimination will be described with reference to FIGS. 1-3.

The SSND 20 includes a neutron scintillator 24 for absorbing a neutron. The neutron scintillator 24 is provided with a back side for discharging a blue scintillation light in response to the absorbed neutron. An array 26 of wavelength-shifting (WLS) fibers 28 is provided proximate the back side of the scintillator 24 for shifting the blue scintillation light to a green light. The array 26 of WLS fibers 28 can be disposed in a two-dimensional pattern to define a plurality of scattering plane pixels where the WLS fibers 28 overlap. Next, a plurality of photomultiplier tubes (PMTs) 30 is provided in coded optical communication with the array 26 of WLS fibers 28 for converting the green light to electronic signals. A computer 32 can also be provided for processing the electronic signals to determine a position on the scintillator 24 where the neutron was absorbed.

Neutron sensitivity is achieved by including atomic isotopes that emit an energetic charged particle upon absorbing a neutron as neutron converter material in the scintillator 24. Examples of such neutron converter isotopes include but are not limited to B-10, Li-6, Gd-157, U-235 and U-238. The neutron converter isotopes may be incorporated into fluorescent nanoparticles, chemically bonded to the surface of the nanoparticles, placed as dopant materials embedded in the material surrounding the fluorescent nanoparticles, formed as layers sandwiched between layers of fluorescent material (material that contains embedded fluorescent particles or is itself inherently fluorescent), formed into nanoparticles that are then embedded in a fluorescent matrix material or embedded in a transparent matrix along with fluorescent nanoparticles, etc. The energetic charged particles created by the neutron interaction travel some microns through the scintillator as they relinquish their energy and stop. Their rate of energy deposition per unit of travel distance is roughly proportional to the density of the materials through which they pass. Energy that is either directly deposited in the fluorescent nanoparticles or nano-sized objects or passes into them from the material surrounding them (if the latter happens, the nanoparticles are acting as activators) causes the nanoparticles to scintillate (emit light).

In one example of scintillator 24, neutron converter isotopes are mixed into a transparent matrix that has fluorescent nanoparticles embedded throughout it. Absorption of neutrons by the neutron converter isotopes result in the production of one or more energetic charged particles that then travel through the scintillator 24, depositing energy in both the nanoparticles and the matrix material. Energy that is either deposited directly into or migrates into the nanoparticles from the surrounding area causes the nanoparticles to scintillate/fluoresce. There are particular combinations of nanoparticle size and nanoparticles and neutron converter material loading levels in the scintillator that are optimal for particular applications. The particular combination depends on the user's priorities with respect to intensity of light emission, neutron detection efficiency, neutron-gamma discrimination, density of the various materials involved (transparent matrix, neutron converter material, nanoparticle dopants), and other factors and optimized combinations of composite scintillator design parameters can be determined using simulations and experiments, simulations requiring that appropriate properties regarding the scintillator constituent materials are known.

In another example, the scintillator 24 can be constructed from a manufactured sheet consisting of LiFZnS mixed with an organic polymer and pressed into a desired shape. The Li is a specific isotope ($^6$Li) which has a large neutron capture cross section, while the ZnS:Ag is the activated scintillator. The combination of LiF and Ag activated ZnS creates a neutron sensitive scintillator.

A neutron is absorbed by a $^6$Li atom that undergoes a nuclear reaction in which it splits into two reaction products, a triton and an alpha particle. These two reaction products travel through the scintillator, depositing energy as they go. Energy deposited in the ZnS:Ag by the reaction products produces scintillation light emission, for example, blue light.

In the scintillator 24, the $^6$Li content may be increased by a factor of two over standard, commercially-available scintillators. This increase in the Li content increases the efficiency of the neutron capture with degradation in the magnitude of scintillation light.

Figure 2:
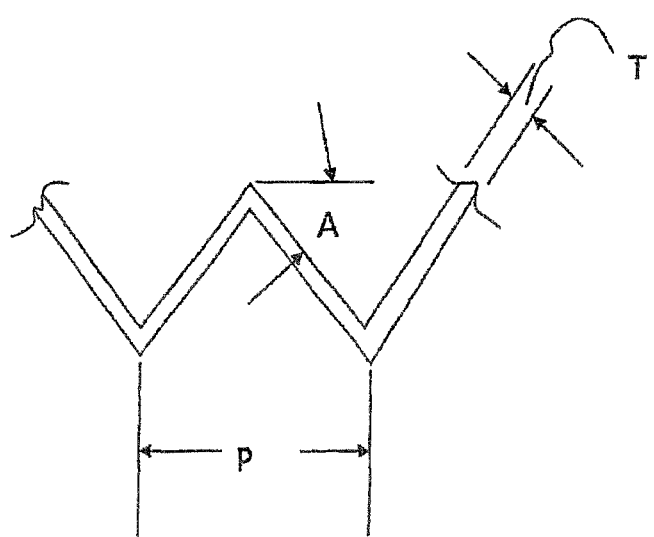
FIG. 2 is a detailed view of the example shifting scintillator neutron detector of FIG. 1, illustrating a detailed portion of the scintillator.

Referring to FIG. 2, the scintillator 24 can have a thickness T that is approximately 0.4 millimeters thick and compressed to minimize air interfaces. The scintillator 24 can be formed with corrugations of 2.5 millimeter in pitch P and 60 degree angles A. The scintillator 24 of the present example has an active area of 772 millimeters by 386 millimeters, which is about 0.3 square meters per module. The present example has a 50 millimeter by 5 millimeter pixel 36 position resolution, but this resolution can be altered to meet the requirements of the application by rerouting the fibers 28. Each module has 8 rows of 154 pixels for a total of 1232 pixels. A total of eight PMTs 30 are used to define to 50 millimeter, out of scattering plane pixels, although this can be varied. A total of twenty PMTs are used to define the 5 millimeter, in scattering plane pixels, although this can be varied.

The detector 20 has high neutron capture efficiency, in the range of 60% for 1 Angstrom neutrons and microsecond time resolution for neutron events. The limiting factor in the time resolution is the slowness of the LiFZnS scintillator.

The position and time of each neutron capture can be stored in event mode or in a histogram. In event mode, every detected neutron is recorded as to its position on time of detection, while in a histogram only the number of neutrons detected at a certain position over a certain detection time period is recorded.

Gamma rejection is based on pulse shape discrimination and is orders of magnitude better than typical scintillation detectors. Each detector has 0.3 square meters of active area, and is designed to be tiled into large arrays with minimal gap area. In one example, a scintillator has an active area of 772 millimeters by 386 millimeters, which is approximately 0.3 square meters per module.

Figure 3:
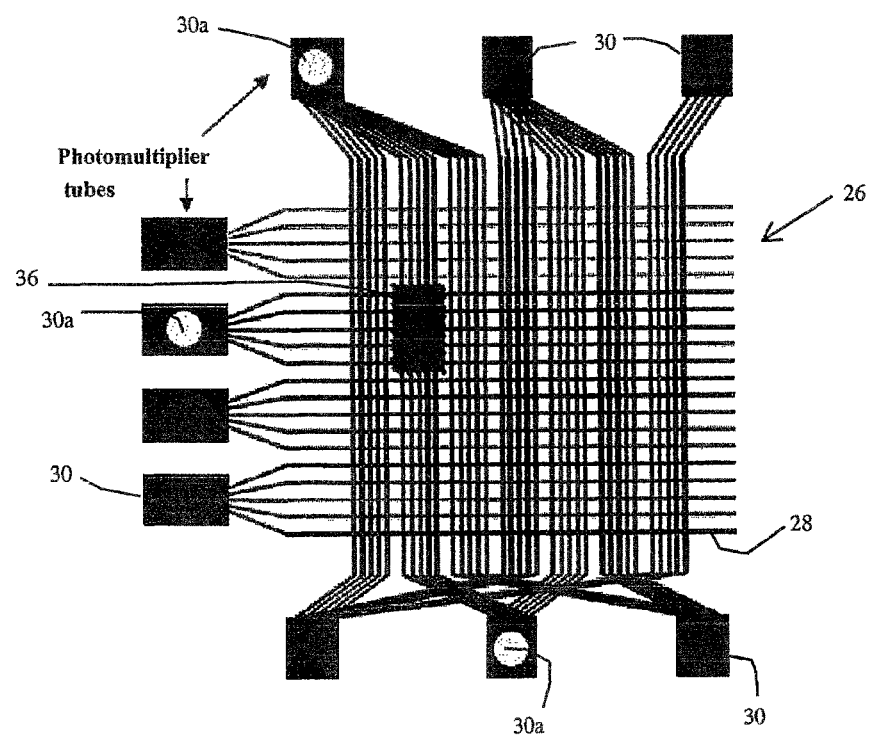
FIG. 3 is a schematic view of the example shifting scintillator neutron detector of FIG. 1, illustrating an X-Y wavelength shifting fiber grid and photomultiplier tubes.

When some of the blue scintillation light leaves the scintillator 24 it impinges on an X-Y array 26 of green WLS fibers 28 as shown in FIG. 3. The blue light is absorbed by a wavelength shifting dye in the WLS fibers 28 and reemitted as isotropic green light. Because the directions of the green photons are isotropic, some of the light is trapped in the WLS fibers 28 and travels to the end of the WLS fibers 28. The WLS fibers 28 are double clad, i.e., having a central core and two sheaths of different refractive indexes, to improve the transmission of the green light. The PMTs 30, as shown in FIG. 3, detect these green photons, convert the light to an electric pulse, and amplify the signals. The PMTs 30 have green enhanced photocathodes to improve the detection efficiency for the green light. The electric pulses output by the PMTs 30 are sent to a board 32 where they trigger fast comparators 34 disposed around the edge of the board 32. The board 32 counts single photon pulses that are 3 ns wide. The entire board is designed to handle these high frequency pulses. The board 32, an electronics circuit board, may include a commercial Field Programmable Gate Array (FPGA) with the ability to process electronic pulses of the order of 1 ns in width. The main functions for the board 32 are to provide pulse stretching and discrimination, count pulses from the PMTs 30, analyze the pulse train, determine position and time of neutron detection, and provide a digital communication link with external systems such as a computer.

The fast comparators 34 digitize the pulses into a bit stream that is detected by the high speed FPGA chip on the board. As discussed in further detail below, the FPGA counts photons in multiple time bins to reject gamma rays, and analyzes the bit stream from the fast comparators 34 to determine which three of the plurality of PMTs 30 recorded the neutron capture event.

Gamma radiation produces pulses that have high but short pulses of the order of 100 ns, while neutrons produce pulses that are longer of the order of microseconds. This difference in pulse duration allows for discrimination between the two types of radiation.

For example, consider the situation where one creates ten 200 nsec bins. A gamma may have 5 counts in the first 200 nsec bin, 2 counts in the second 200 nsec bin and no counts in any of the other bins. A neutron might have 3 counts in the first through fifth bins and one or two counts in each the remaining bins. Counts here may refer to either to the number of pulse edges, (either rising or falling) contained in the pulse stream or the number of clock ticks a pulse is above the comparator threshold, a method know as time above threshold.

By checking for the presence of the slow component, the FPGA can eliminate gamma ray events. The length of the time bins are computer controlled and can be varied. This data is then used to determine where within the scintillator 24 the event took place.

Referring now to FIG. 3, a schematic diagram of the X-Y array 26 of green wavelength shifting fibers 28 illustrates the identification of the location of a neutron event. In this example, an individual pixel 36 is defined by four fibers 28 running in the X (left to right in the figure) direction and four fibers 28 disposed in the Y (up and down in the figure) direction. The coincidence between the three tubes, i.e. when one or more counts in the first time bin in at least three tubes is observed, specifies a pixel location. A neutron event illustrated in the pixel 36 deposits light in the X-Y wavelength shifting fiber array 26. This light travels in the X and Y direction to the three PMTs 30 with dots 30a. The signals from the three PMTs 30a are digitized on the board 32 and the FPGA uses the fact that these three PMTs 30a had signals to place the event in the pixel 36. The event pixel 36 is identified using a three PMT 30a coincidence that follows an $M \times ^2C_N$ encoding scheme. Such encoding schemes allow one to determine a large number of detector pixels, typically of the order of 1000 with considerably fewer PMTs, typically about 30.

Once the position (e.g. pixel 36) is determined, the data is time stamped so that the neutron time of flight can be determined, and given a pixel ID. This event data is sent to the preprocessor computer of the data acquisition system (DAS) where it is saved for further analysis. During a neutron scattering experiment, millions of scattered neutrons are recorded on an array of these detectors, and the data file is used for scientific applications.

As described above, the board 32 digitizes single photons from the neutron capture and uses a high speed FPGA with unique code to determine where the event took place. There is additional FPGA code allowing the board 32 to communicate with external devices such as computers. This allows for easy customization of parameters used in pulse shape analysis and discrimination such as coincidence requirements, how many counts must be seen in how many and which tube, and minimum photon count thresholds, how many counts in each time bin.

The time resolution is limited by the scintillator 24 and is about 5 μs, and the SSND 20 consumes approximately 16 Watts of power during operation. Gamma ray rejection was measured to be approximately $2 \times 10^{-6}$ with a $^{137}Cs$ source generating a 10 mR field. The scintillator neutron capture efficiency was found to be about 75% for thermal neutrons.

Various aspects of the board 32 may be implemented as a program, software, or computer instructions embodied in a computer or machine usable or readable storage medium, which causes the computer or machine to perform the steps of the above-described functions of the board 32 when executed on the computer, processor, and/or machine. For example, identification of event pixel 36 based on signals from the three PMTs 30a may be implemented as a program, software, or computer instructions embodied in a computer or machine usable or readable storage medium.

The above-described SSND 20 is designed for neutron diffraction instruments but it may also be useful as a replacement detector for security applications, such as portal monitoring, and for inelastic neutron scattering instruments. Conventional neutron detection devices scan cargo passing though foreign seaports to detect the proliferation of radioactive sources. The devices require helium 3 for detection of neutrons, which are emitted by the nuclear-weapon material plutonium. Helium 3 is a byproduct of the decay of tritium, which is produced only in limited quantities in the United States. The stockpile of helium 3 is estimated to be 10 times smaller than required. The above-described SSND 20 may be part of a less expensive alternative to helium-3 detectors that are becoming more costly and difficult to procure.

Figure 4:
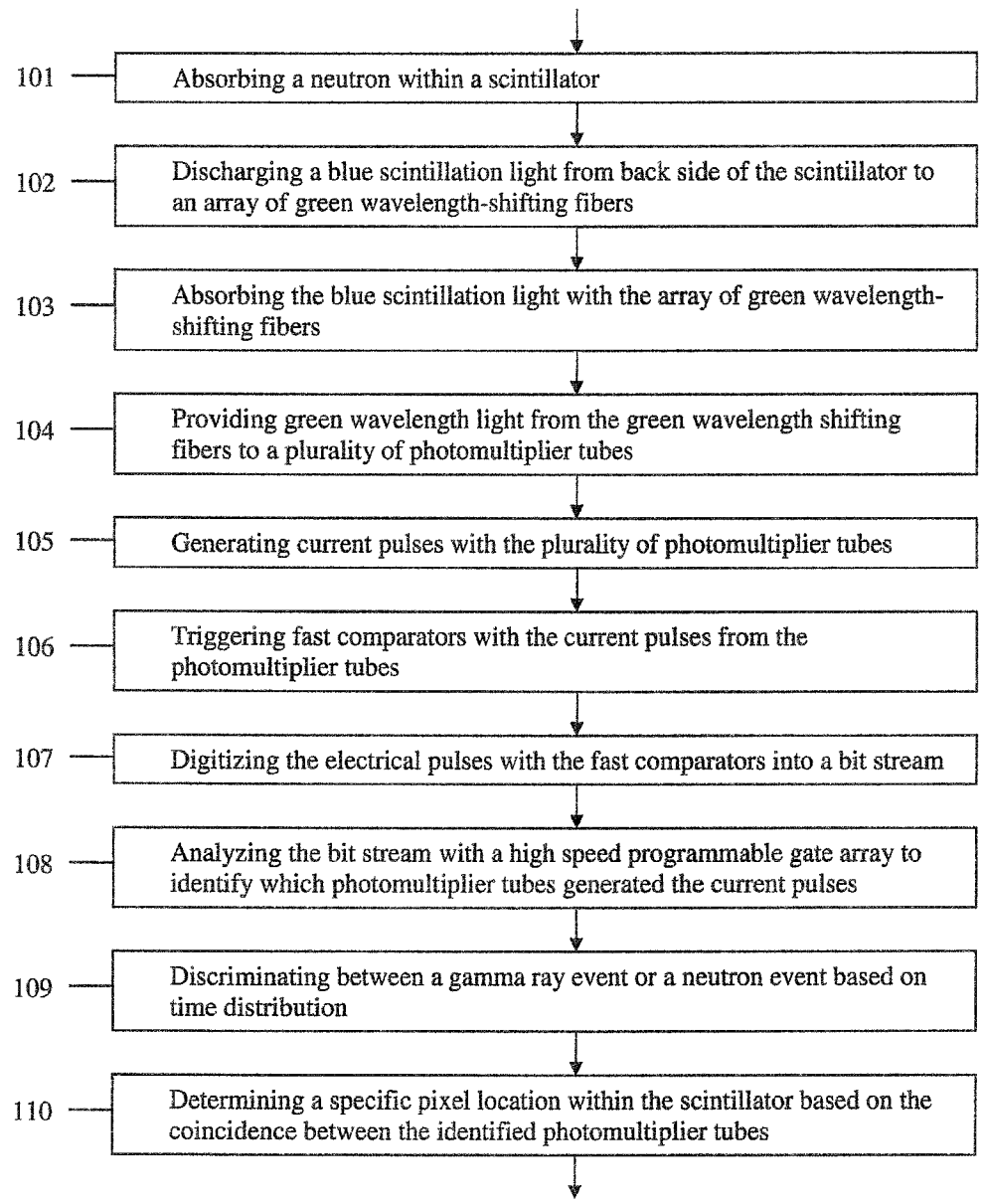
FIG. 4 is a series of steps illustrating a method of detecting neutrons.

Next, a method 100 of locating a neutron event with a detector will be described with reference to FIG. 4.

In one example, a neutron is absorbed within a scintillator in a first step represented by block 101. In a second step represented by block 102, a blue scintillation light is discharged from a back side of the scintillator to an array of green wavelength shifting fibers. In a third step represented by block 103, the blue scintillation light is absorbed with an array of green wavelength shifting fibers. In a fourth step represented by block 104, the green wavelength shifting fibers provide green wavelength light to PMTs. In a fifth step represented by block 105, the PMTs are used to generate current pulses from the green wavelength light. In a sixth step represented by block 106, a series of fast comparators, capable of responding to 1 nsec pulses, are triggered with the current pulses from the PMTs and provide a pulse at a voltage level the FPGA can process. In a seventh step represented by block 107, the electrical pulses are then digitized into a bit stream by the fast comparators. In an eighth step represented by block 108, with a high speed field programmable gate array, the bit stream is analyzed to identify which photomultiplier tubes generated the current pulses. In a ninth step represented by block 109, the time distribution of the event is used to discriminate whether the event is a gamma ray or a neutron. Finally, in a tenth step represented by block 110, based on the coincidence between the identified photomultiplier tubes, a specific pixel location within the scintillator is determined.

While the examples presented illustrate specific examples in the field of neutron scattering detection, other fields, such as nuclear security and inelastic neutron scattering, will similarly benefit. Accordingly, the invention is intended to embrace those alternatives, modifications, equivalents, and variations as fall within the broad scope of the appended claims.

What is claimed is:

1. An apparatus comprising:
    a scintillator for absorbing a neutron, the scintillator having a back side for discharging a scintillation light of a first wavelength in response to the absorbed neutron;
    an array of wavelength-shifting fibers proximate to the back side of the scintillator for shifting the scintillation light of the first wavelength to light of a second wavelength, the wavelength-shifting fibers being disposed in a two-dimensional pattern and defining a plurality of scattering plane pixels where the wavelength-shifting fibers overlap;
    a plurality of photomultiplier tubes, in coded optical communication with the wavelength-shifting fibers, for converting the light of the second wavelength to an electronic signal including an electrical pulse;
a series of fast comparators triggered with the electrical pulse and digitizing each detected electrical pulse into a bit stream;
a high speed programmable gate array for detecting the bit stream that corresponds to the electrical pulse, for counting photons in multiple time bins that correspond to the electrical pulse, and for identifying which photomultiplier tubes generated the electronic signal including the electrical pulse; and
a processor for discriminating between a gamma ray event and a neutron event based on analysis of features within a distribution of photon counts detected within each of the multiple time bins that correspond to the electrical pulse, said features including a duration of said electrical pulse and a shape of said electrical pulse, and for processing the bit stream to identify one of the plurality of scattering plane pixels as indicative of a position within the scintillator where the neutron was absorbed.

2. The apparatus according to claim 1, wherein the series of fast comparators pulse stretch the electronic signals.

3. The apparatus according to claim 2, wherein the processor processes the electronic signal based on pulse shape discrimination to ascertain whether the electronic signal resulted from absorption of a neutron by the scintillator, wherein the pulse shape discrimination discriminates between neutron produced pulses that are longer relative to gamma ray produced pulses.

4. The apparatus according to claim 1, wherein the processor processes the electronic signal based on coincidence coding to identify the one of the plurality of scattering plane pixels as indicative of a position within the scintillator where the neutron was absorbed.

5. The apparatus according to claim 1, wherein the scintillation light of the first wavelength is a blue light.

6. The apparatus according to claim 1, wherein the scintillation light of the second wavelength is a green light.

7. The apparatus according to claim 1, wherein each of said multiple time bins has a computer-controlled length.

8. The apparatus according to claim 1, wherein said multiple time bins are physically implemented as components of said high speed programmable gate array that are configured to store count data therein.

9. The apparatus according to claim 1, wherein said series of fast comparators is configured to respond to 1 nsec pulses.

10. The apparatus according to claim 1, wherein said high speed programmable gate array is configured to process electronic pulse of the order of 1 ns.

11. A method of locating a neutron event with a detector comprising:
absorbing a neutron within a scintillator and discharging a scintillation light of a first wavelength from a back side of the scintillator to an array of wavelength shifting fibers disposed in a two-dimensional pattern and defining a plurality of scattering plane pixels where the wavelength-shifting fibers overlap;
shifting the scintillation light of the first wavelength with the array of wavelength shifting fibers to a light of a second wavelength;
converting the light of the second wavelength to an electronic signal including an electrical pulse by a plurality of photomultiplier tubes in coded optical communication with the wavelength shifting fibers;
triggering fast comparators with the electrical pulse and digitizing each detected electrical pulse into a bit stream;
counting photons in multiple time bins that correspond to the electrical pulse by detecting the bit stream corresponding to the electrical pulse with a high speed programmable gate array, and identifying which photomultiplier tubes generated the electronic signal including the electrical pulse; and
discriminating with a processor between a gamma ray event and a neutron event based on analysis of features within a distribution of photon counts detected within each of the multiple time bins that correspond to the electrical pulse, said features including a duration of said electrical pulse and a shape of said electrical pulse, and processing the bit stream with the processor to identify one of the plurality of scattering plane pixels as indicative of a position within the scintillator where the neutron was absorbed.

12. The method of claim 11, wherein the series of fast comparators pulse stretch the electronic signals.

13. The method of claim 12, wherein the processor processes the electronic signal based on pulse shape discrimination to ascertain whether the electronic signal resulted from absorption of a neutron by the scintillator, wherein the pulse shape discrimination discriminates between neutron produced pulses that are longer relative to gamma ray produced pulses.

14. The method of claim 11, wherein the processor processes the electronic signal based on coincidence coding to identify the one of the plurality of scattering plane pixels as indicative of a position within the scintillator where the neutron was absorbed.

15. The method of claim 11, wherein the scintillation light of the first wavelength is a blue light.

16. The method of claim 11, wherein the scintillation light of the second wavelength is a green light.

17. The method of claim 11, wherein further comprising controlling a length of each of said multiple time bins employing a computer.

18. The method of claim 11, wherein said multiple time bins physically implemented as components of said high speed programmable gate array that are configured to store count data therein.

19. The method of claim 11, wherein said series of fast comparators responds to 1 nsec pulses.

20. The method of claim 11, wherein said high speed programmable gate array processes electronic pulse of the order of 1 ns.

* * * * *